INVENTOR
by Gabriel Chasserieau
ATTORNEY

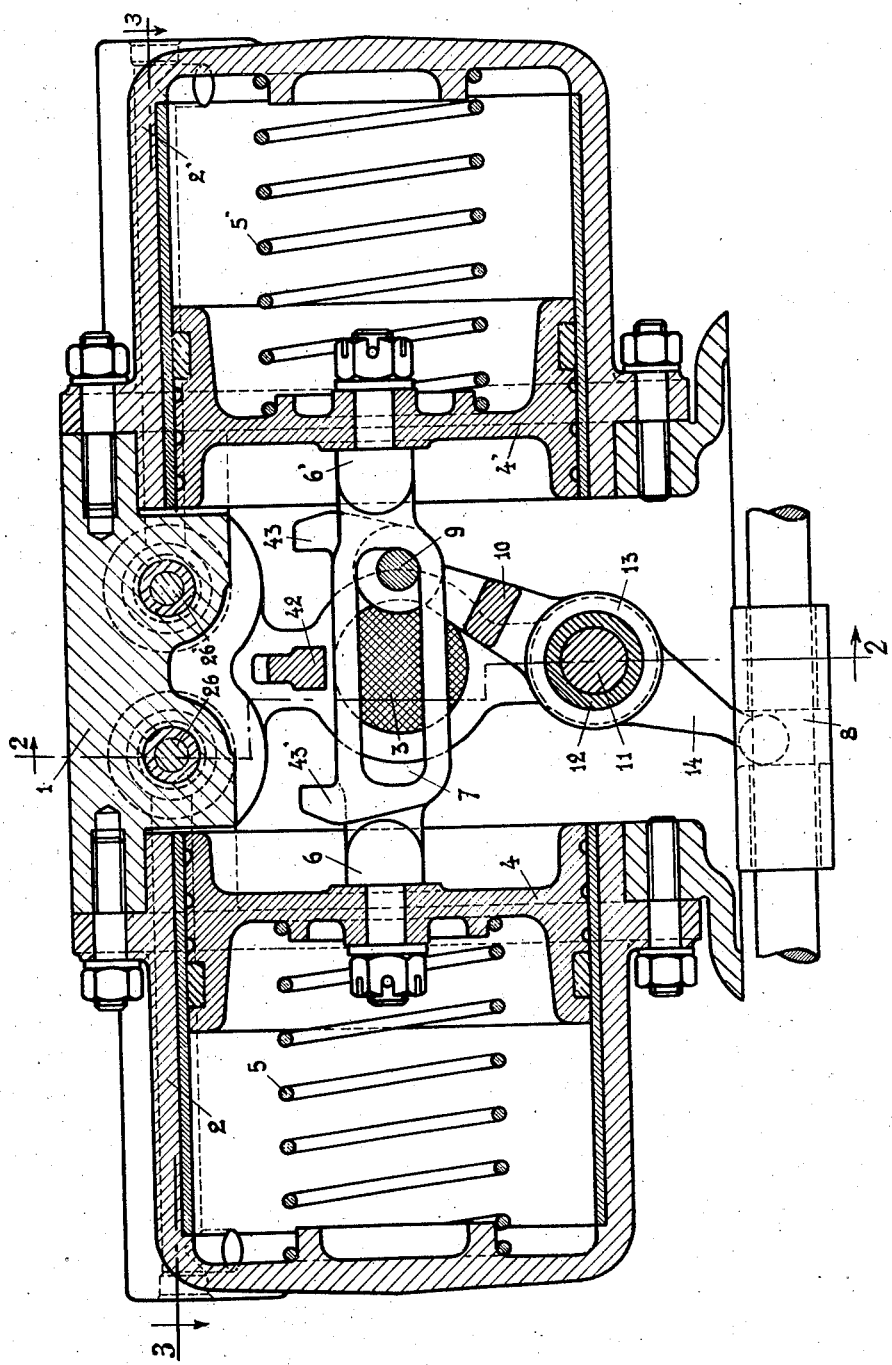

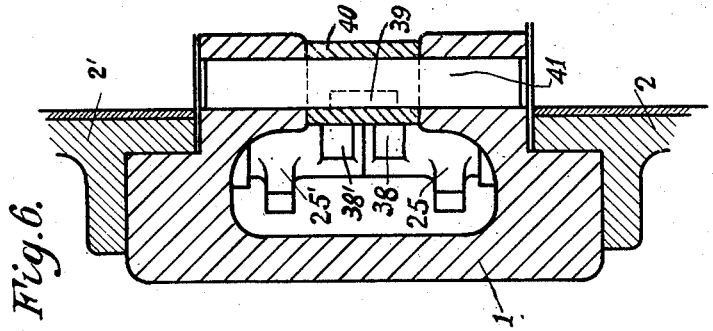
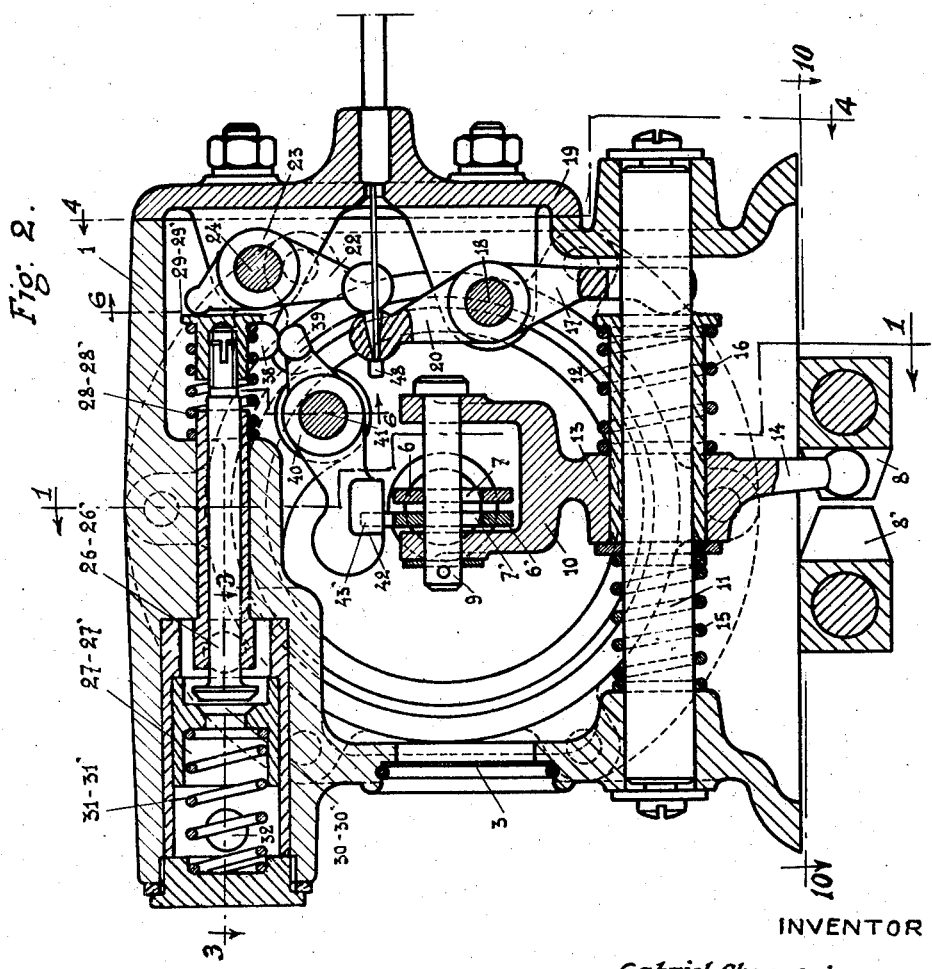

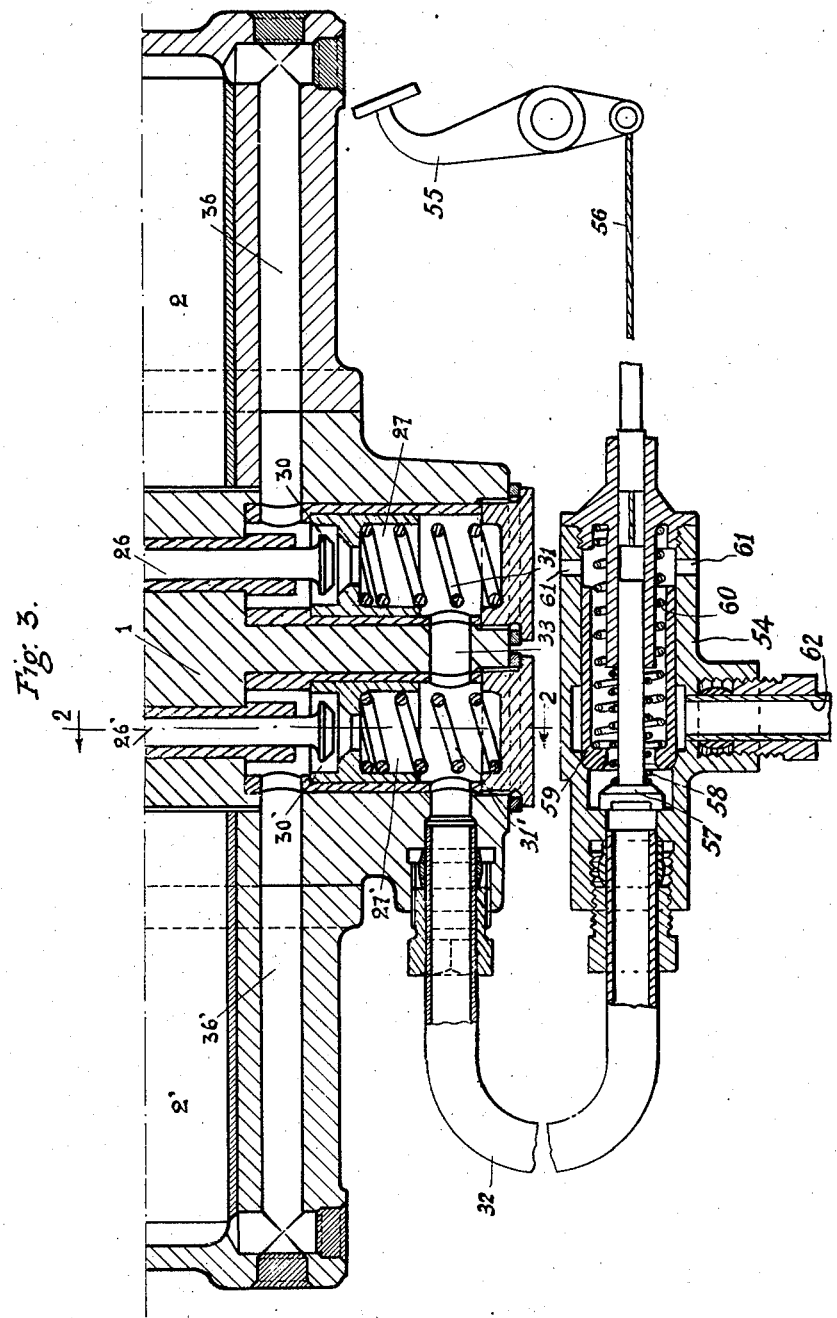

Patented May 10, 1938

2,116,616

UNITED STATES PATENT OFFICE 2,116,616

PRESELECTIVE APPARATUS FOR GEAR CHANGING

Gabriel Chasserieau, Brussels, Belgium

Application November 11, 1935, Serial No. 49,241
In Belgium October 9, 1935

5 Claims. (Cl. 74—334)

This invention relates to a preselecting device for use with variable speed gear boxes having sliding selectors.

Objects of the invention are to reduce to a minimum the movements necessary to control an automobile, to dispense with the usual gear lever, to provide for a more gradual change from one speed to another, to enable a desired gear to be selected in advance and to be put in operation automatically at the desired moment.

The apparatus according to the invention comprises a pair of cylinders adapted to be placed in communication with suction created by the engine, a piston adapted to move within each cylinder under the influence of the suction and to be coupled with the sliding selectors of the gear box and lever mechanism arranged to be actuated to move valves which control the connection of the cylinders with the engine suction, by connecting members under the control of the driver.

A feature of the apparatus according to the invention is that the apparatus operates pneumatically without the aid of electricity.

A further feature lies in the fact that the apparatus according to the invention can be used without modification with any type of automatic declutching apparatus and the change of speed effected by the displacement of the throttle pedal as well as by the displacement of the clutch pedal.

A form of construction of the apparatus according to the invention is illustrated, by way of example, in the accompanying drawings, in which:—

Figure 1 is a longitudinal section along line 1—1 of Figure 2,

Figure 2 is a transverse section taken on line 2—2 of Figures 1 and 3,

Figure 4:
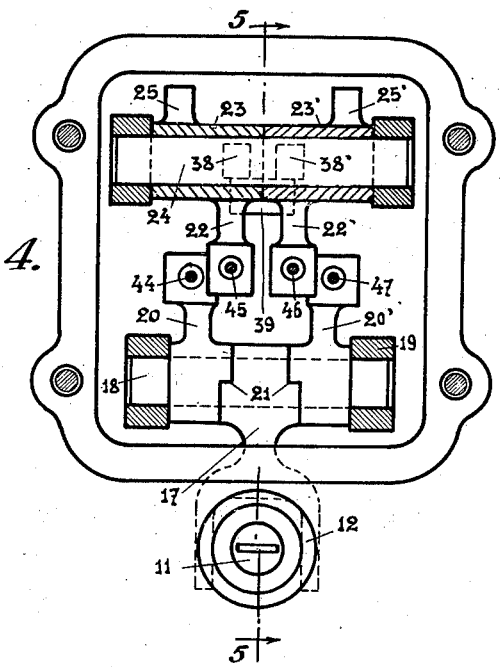
Figure 5:
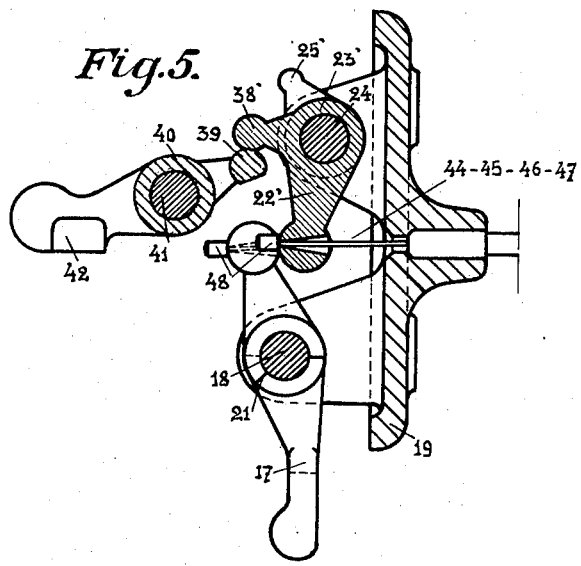
Figure 7:
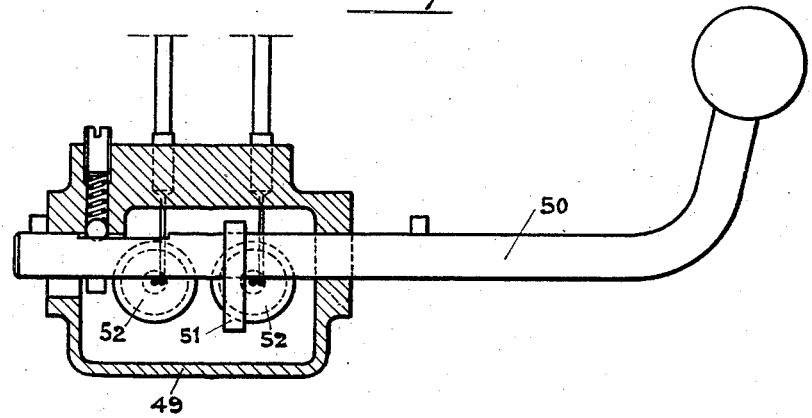
Figure 8:
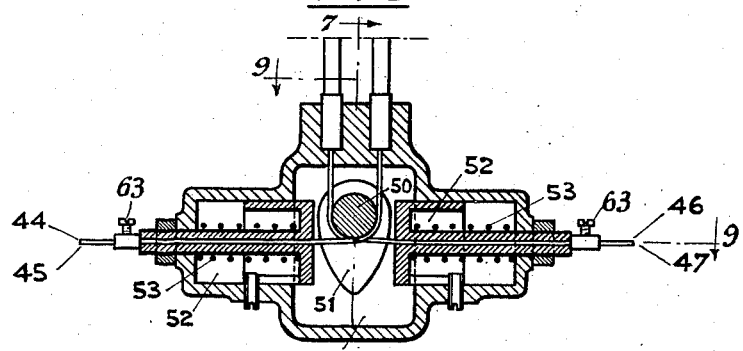
Figure 9:
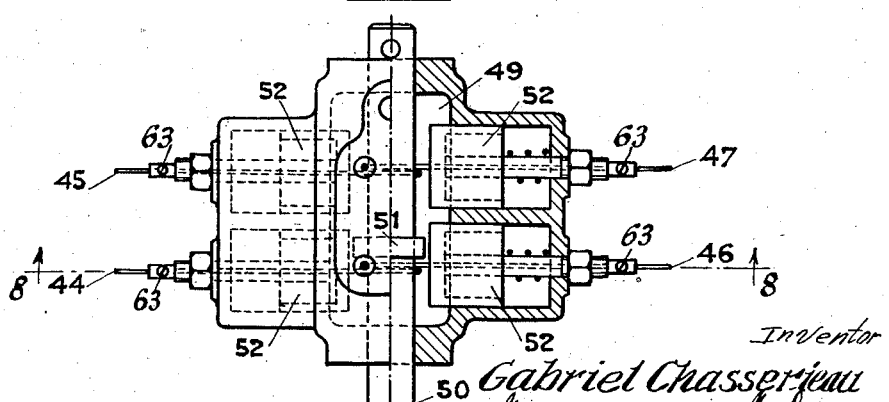
Figure 10:
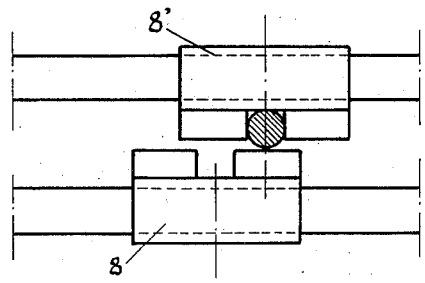
Figure 11:
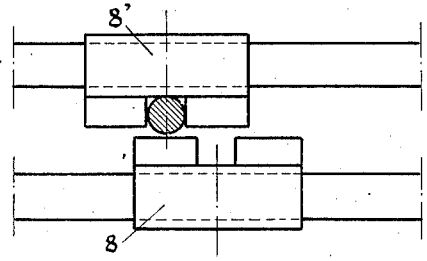
Figure 12:
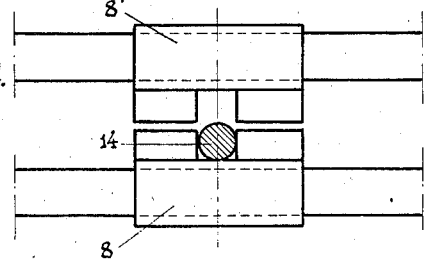
Figure 13:
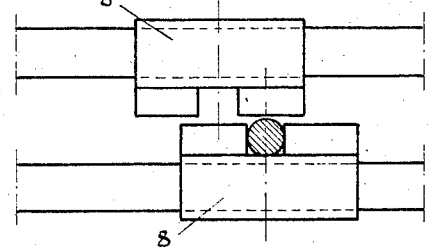
Figure 14:
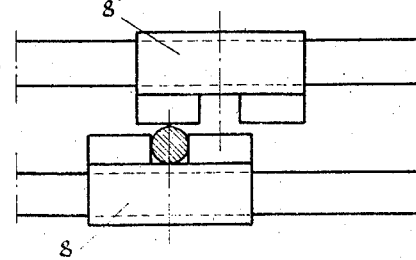

Figure 3 is a longitudinal section taken on line 3—3 of Figures 1 and 2, showing the piping connected to the vacuum source of the engine, from the control valve, and the connection of said valve with the transmission clutch, Figure 4 is a partial front view of the preselector taken on line 4—4 of Figure 2, Figure 5 is a partial side view of the preselector taken on line 5—5 of Figure 4, Figure 6 shows a section of the neutral point control taken on line 6—6 of Figure 2, Figure 7 is a longitudinal section of the control casing taken on line 7—7 of Figure 8, Figure 8 is a similar transverse section taken on line 8—8 of Figure 9, Figure 9 is a plan view and partial section according to line 9—9 of Figure 8, Figure 10 is a plan view of the transmission sliders according to line 10—10 of Figure 2 and showing the position of said sliders in reverse, Figure 11 is a same plan view of Figure 2 but showing the sliders in low gear, and Figures 12, 13 and 14 represent the same plan view but showing the sliders respectively in neutral, in second and in third gear.

The mechanical-pneumatic preselection change speed device is composed of a casing 1 fixed on the upper part of and replacing the cover of the gear box, and two cylinders 2 and 2' which are rigidly attached to the casing. These cylinders are disposed in tandem in the longitudinal direction of the box and communicate with the atmosphere through the interior of the casing 1 and by an aperture 3 situated in a wall of the latter. In these cylinders there operate pistons 4, 4' which are maintained at a predetermined position by springs 5, 5' which bear on the one hand on the head of the cylinders, and on the other hand on the pistons. These pistons are provided with rigid members 6, 6' having slots 7, 7', the length of each of which is determined in accordance with the stroke of the pistons and that of the sliding selectors 8 and 8' of the gear box. These rigid members, which are offset in respect to the axis of the pistons, are situated on either side of this axis and do not hinder the movement one of the other, but slide one against the other during the reciprocating movements of the pistons. A pin 9, which is disposed transversely to the members 6, 6' and enters the slots, is fixed to a forked arm 10. The latter is arranged to be moved by one or the other of the members 6, 6' to effect the oscillation, about a sleeve 12 on a pin 11 held transversely in the casing 1, of a rocking lever 13, the arm 14 of which actually displaces the sliding selector 8 or 8' of the box. The engagement of the arm 14 with one or the other sliding selector is effected by a transverse displacement of the rocking lever 13 under the action of the sleeve 12 and a spring 16. The arm 14 of the rocking lever is normally kept in engagement with the selector 8 by the influence of a helical spring 15 placed around the pin and bearing on the one hand against the casing 1 and on the other hand against the rocking lever 13. A forked lever arm 17 is arranged, when actuated, to exert a thrust on the sleeve, and is adapted to oscillate about a pin 18 fixed on a cover 19 bolted to the casing. In addition to the forked lever arm 17 the pin 18 carries, oscillatable about it, two levers 20, 20', which are adapted, the one or the other, to draw the forked arm 17 one way only by means of appropriate shoulders 21. The ends of the levers 20, 20' are in direct contact with the lower arm 22, 22' of two-armed levers 23, 23' which are freely carried on a pin 24 fixed to the cover 19, and by means of the arms 25, 25' and valve members 26, 26' effect the closing of valves 27, 27' which are normally open. The valves are returned by helical springs 28, 28', the tension of which may be regulated by abutting members 29, 29', against which bear the arms 25, 25' of the two-armed levers 23, 23'.

The valves 27, 27', the seats of which are controlled by springs 31, 31', are in communication, on the one hand either directly by the pipe 32 or through a passage 33 with a control valve 54 actuated by the clutch pedal 55, the oscillating movement thereof displacing by means of a cable 56 a valve 57 loaded by a spring 58 and a piston valve 59 loaded also by a spring 60, whereby to cause the closure of air inlets 61 and the application of vacuum through the motor-connected piping 62. The valves 27 and 27' are, on the other hand, in communication with the cylinders 2 and 2' through the conduits 36, 36'. The two-armed levers 23, 23' are provided with arms 38, 38' normally in contact with a lever arm 39 integral with a rocking lever 40 adapted to oscillate about a pivot 41 located in the casing 1. A second and oppositely disposed lever arm 42 acts as a counterweight and is disposed above the members 6, 6' so that it forms a stop for the travel of the pistons 4, 4' by engagement with stops 43, 43' provided on the end of the members 6, 6'. When such engagement takes place, the travel permitted to the pistons, the gears being at neutral, is reduced by one half.

The levers 20, 20' and 22, 22' are controlled by Bowden cables 44, 45, 46 and 47, Fig. 4, which can slide freely in perforations provided in the ends of the levers and draw the latter in one direction by means of the nipples 48, Figure 5. These cables pass over a bolt 50, Fig. 8, and each is connected to a control piston 52 inside a casing 49, movement being effected by means of the bolt 50 which slides to select and turns to operate, thus providing four gear positions corresponding to first, second and third speed and reverse. A cam 51 rigidly connected to the bolt 50 displaces, in a gyratory movement, the small pistons 52 housed in the interior of the casing 49 and held in place by springs 53, these pistons displacing the cables 44, 45, 46 and 47 by pulling upon their ends which pass over the bolt 50. The said cables are connected also to a control casing 49 preferably mounted on the dash board, the gear-shifting being performed by means of a bolt 50 displaceable to the front and rear, or inversely, and oscillatable to right or left so as to give four positions corresponding respectively to 1st, 2nd, and 3rd speeds forward and one speed in reverse. A cam 51 formed on bolt 50 pushes, in a rotary movement, one or the other of the small pistons 52 disposed within the casing 49 and acted upon by springs 53, the said pistons exerting a traction on cables 44, 45, 46 and 47 which traverse the pistons and to which they are secured by screws 63.

The operation of the change-speed device which is shown in Figs. 1–5 with third speed in engagement, the preselection members being in their neutral position and the pistons 4, 4' returned to their initial position, is as follows.

When the automobile is stationary with its engine idling, all the members of the preselection change speed device are at neutral and occupy their normal position without being influenced or acted on by any force. The valve 27 and 27' are open and in communication on the one hand respectively with the cylinders 2, 2' by means of the ducts 36, 36', and on the other hand by means of the pipe 32 and the aperture 33 with the control valve connected to the clutch pedal. The control cables 44, 45, 46 and 47 of the preselection device are slack, the lever 42 is lowered, the pistons 4, 4' in position of rest, that is their innermost position in the interior of the casing 1, while the lever 14 engaged in the recess in the sliding selector 8 (Fig. 12) is kept in this position by the eased springs 15 and 16.

To engage first speed, the driver places the control box bolt situated within his reach on the first speed position. He thus tensions the cable 44 and causes the lever 20 to oscillate, consequently drawing along the forked arm 17 and thrusting back the sleeve 12. The sleeve in sliding on the pin 11 compresses the spring 15, and by means of the spring 16 carries along the rocking lever 13, the arm 14 of which then enters the recess of the sliding selector 8'. At the same time the lever 20, in contact with the lower arm 22 of the two-armed lever 23, causes the latter to oscillate in its turn. This lever then causes the valve 27 to be closed by the pressure of the arm 25 on the valve 26 while the rocking lever 40 by the contact of the arms 38 and 39 thus raises the lever 42 leaving a free passage for the members 6, 6' and so permitting displacement of the pistons 4, 4' to occur. By pressing on the clutch pedal the driver causes the control valve to open and thereby places the suction of the engine in communication with the cylinder 2' over the pipe 32 and the valve 27' which remains open. The piston 4' under the action of the engine suction compresses the spring 5' and by moving the member 6' and the pin 9 displaces the rocking lever 13 so that the end of the arm 14 causes the sliding selector 8' to be transferred into the first speed position as shown in Fig. 11. At this movement, the return movement of the clutch pedal breaks the communication with the engine suction, but re-establishes atmospheric pressure in the cylinder 2' to permit the spring 5' to return the piston to its starting position.

To pass from first to second speed the driver places the control button on the second speed position, thus tensioning the cable 46 and slackening the cable 44. The result of these simultaneous movements is:—

(1) To cause by means of the lever 22' the rocking of the rocking lever 23' which, by acting on the finger 25', closes the valve member 26' of the valve member 27;

(2) To keep the arm 42 of the rocking lever raised in order to permit the passage of the members 6, 6';

(3) By the slackening of the cable 44, for permitting the forked arm 17 and the sleeve 12, under the influence of the spring 16, to return to their normal position.

Nevertheless, as the sliding selector 8' is in first speed position and the arm 14 of the rocking lever 13 is kept in the recess of this selector, the spring 15 remains under tension between the casing 1 and the rocking lever 13. When the driver wishes to pass to second speed, it is sufficient for him to press on the clutch pedal. This movement puts the cylinder 2, by means of the control valve, the pipe 32, the aperture 33, the valve 27 which has remained open, and the duct 36, under suction. The latter acts on the piston 4 which, by means of the member 6, causes the rocking lever 13 to oscillate and the arm 14 returns the sliding selector 8'. When the piston has made half its stroke, the recess of the sliding selector 8' lies opposite that of the selector 8 and permits the lever 14, by sliding transversely on the sleeve 12 under the influence of the expansion spring 15, to engage therein. The piston continues its course without stopping, and the lever 14 which, after having abandoned the selector 8' in neutral position and engaged the selector 8, draws the latter selector into second speed position, as shown in Fig. 13.

At this moment the return of the clutch pedal permits atmospheric equilibrium to be re-established in the cylinder 2, and the piston 4 returns to its starting point under the influence of the spring 5.

To pass from second to third speed the driver places the control button on the corresponding position and thus tensions cable 45 while liberating cable 46. The lever 22 then rocks the two-armed lever 23 which, by means of the arm 28, keeps the lever 42 of the rocking lever 40 raised, while the finger 25 and the valve member 26 cause the valve 27 to close.

At the desired moment the driver lowers the clutch pedal thus effecting the opening of the control valve and connects the cylinder 2' with the engine suction. The piston 4' is displaced at the same time as the member 6', the rocking lever 13 oscillates and the rocking lever 8 is brought into the third speed position as shown in Fig. 14. When the driver releases the clutch pedal, the control valve re-establishes equilibrium in the cylinder 2' and the piston 4' under the influence of the spring 5' returns to its initial position.

In order to set the device "in neutral", that is to say in order to return the selectors 8 and 8' to the neutral point no matter what gear is engaged, the driver places the control button on the neutral-point position. The cables 44, 45, 46 and 47 are then automatically liberated and slackened, the valves 27 and 27' are opened and the lever 42 of the rocking lever 40 is lowered. When pressure is applied to the clutch pedal the engine suction acts at the same time in the cylinders 2 and 2', the pistons 4 and 4' are displaced and carry along the slotted members 6, 6' which return the rocking lever 13 by oscillating it, no matter what is its initial position, towards the centre position, the pistons being arrested halfway through their stroke by the lever 42 coming into contact with the stops 43 and 43' of the members 6, 6'. The selector 8 or 8', which was engaged by the lever 14, is likewise displaced and stops in the centre position as shown in Fig. 12.

To pass into reverse, the selectors having previously been returned to the neutral point, the driver places the button on the reverse position. The pull thus exerted on the cable 47 rocks the lever 20' which, by carrying along the forked arm 17, thrusts back the sleeve 12 slidably carried on the pin 11, compressing the spring 15, and carries along the rocking lever 13 so that the arm 14 enters the recess of the selector 8'. The lever 20' being in contact with the lower finger 22' of the two-armed lever 23', the latter rocks in its turn and by the pressure of the finger 25' on the valve member 26' closes the valve 27'. Thus the lever 42 is lifted by the rocking of the rocking lever 40 caused by the fingers 38' and 39. The pressure applied to the clutch pedal opens the control valve which connects the cylinder 2 with the engine suction. The piston 4, in its displacement, carries along by means of the member 6 the rocking lever 13 so that the lever 14 brings the selector 8' into the reverse position as shown in Fig. 10. As soon as the driver ceases to apply pressure to the clutch pedal, pressure equilibrium is re-established in the cylinder 2 and under the influence of the spring 5 the piston returns to its starting point. When the driver wishes to pass from a higher speed to a lower speed, for example from third to second or from second to first, the operation is carried out in the same manner as for passing from a lower to a higher speed, it being sufficient for him to put the control button on the position corresponding to the speed chosen and to press the clutch pedal, the selector corresponding to the speed preselected then being displaced.

What I claim as my invention and desire to secure by Letters Patent of the United States is:—

1. A preselective gear changing device, comprising in combination with a gear transmission a clutch therefor and a source of vacuum, a pair of cylinders, a piston movable in each of said cylinders under the action of vacuum, sliding selectors adapted to shift the transmission gears, a sliding lever operable by the pistons and adapted to engage said selectors for moving the same; a rocking lever adapted to selectively move said sliding lever into engagement with one of the selectors, valves adapted to place the cylinders in communication with the vacuum source, levers operable to selectively actuate said valves and operate the rocking lever, members under control of an operator, cables connecting said members with the levers, and means operated by the gear clutch for opening and closing communication between the vacuum source and the valves.

2. In combination with a four-speed gear transmission, a pair of cylinders, a piston pneumatically movable in each of said cylinders, means actuated by said pistons for changing gears in a given direction, a rocking lever for shifting said changing means to other gears, valves controlling the pneumatic action in the cylinders, levers corresponding in number to the number of gear speed changes, said levers being adapted to selectively actuate the valves and the rocking lever, cables connected to each of said levers, members actuating said cables under the control of an operator, and manually operable means for controlling the pneumatic action to all valves.

3. A gear changing mechanism of the character described, comprising in combination with a gear transmission, a pair of opposed cylinders, a piston pneumatically movable in each of said cylinders, slotted extensions secured to said pistons, a pivoted arm having a rod engaging in said extensions, means for laterally shifting the said arm, parallel sliding selectors engageable by the pivoted arm, valves for controlling the pneumatic action in the cylinders, levers for actuating said valves and the pivoted arm, members under control of an operator, and cables connecting each of said levers to a corresponding member and equal in number to the number of gear speeds.

4. A preselective gear-shifting mechanism, comprising in combination with a gear transmission having sliding gear-shifting means, a pair of cylinders, a piston pneumatically movable in each of said cylinders, valves controlling the pneumatic action in the cylinders, means co-operating with the pistons for imparting a to and fro movement to the gear shifting means, a rocker for cross-shifting the piston cooperating means, levers operable to set the valves in open and closed positions, cables connecting said levers and rocker to remote controlling members, and clutch-operated means for admitting and shutting off a pneumatic fluid supply to the valves.

5. In a gear-shifter for motor vehicles having a gear transmission, means for sliding said gears and vacuum-producing means for pneumatically actuating the gear shifter, a pair of cylinders having pistons therein movable by the action of atmospheric pressure on one side and vacuum on the other, a pivoted arm adapted to be oscillated by the pistons, means for shifting said arm laterally, the arm being engageable with the means for sliding the transmission gears, valves for controlling the vacuum in the cylinders, levers adapted to operate the valves, members adapted to actuate the arm shifting means, control members manually operable by an operator and corresponding in number to the transmission speeds available, cables connecting said levers and members with the control members, and a foot actuated valve for cutting on and off the vacuum to all the cylinder valves.

GABRIEL CHASSERIEAU.